(12) United States Patent
Niemelä et al.

(10) Patent No.: US 10,565,375 B2
(45) Date of Patent: Feb. 18, 2020

(54) SECURITY OF COMPUTER RESOURCES

(71) Applicant: F-Secure Corporation, Helsinki (FI)

(72) Inventors: Jarno Niemelä, Kirkkonummi (FI); Matteo Cafasso, Helsinki (FI)

(73) Assignee: F-Secure Corporation, Helsinki (FI)

( * ) Notice: Subject to any disclaimer, the term of this patent is extended or adjusted under 35 U.S.C. 154(b) by 159 days.

(21) Appl. No.: 15/412,264

(22) Filed: Jan. 23, 2017

(65) Prior Publication Data

US 2017/0235949 A1    Aug. 17, 2017

(30) Foreign Application Priority Data

Feb. 15, 2016 (GB) .................................. 1602612.2

(51) Int. Cl.
*G06F 21/56* (2013.01)
*G06F 3/06* (2006.01)
*H04L 29/06* (2006.01)

(52) U.S. Cl.
CPC .............. *G06F 21/56* (2013.01); *G06F 3/065* (2013.01); *G06F 3/067* (2013.01); *G06F 3/0619* (2013.01); *G06F 2221/034* (2013.01); *H04L 63/0853* (2013.01); *H04L 63/1408* (2013.01)

(58) Field of Classification Search
CPC ........ G06F 3/0619; G06F 3/065; G06F 3/067; G06F 2221/034; G06F 21/56–566; G06F 21/64–645; G06F 2221/033–034; H04L 63/145; H04L 63/0853; H04L 63/1408
See application file for complete search history.

(56) References Cited

U.S. PATENT DOCUMENTS

| | | | |
|---|---|---|---|
| 2010/0011029 A1 | 1/2010 | Niemelä | 707/200 |
| 2011/0083186 A1* | 4/2011 | Niemela | G06F 21/566 726/24 |
| 2011/0145600 A1 | 6/2011 | Rudelic | 713/193 |
| 2011/0265182 A1* | 10/2011 | Peinado | G06F 21/554 726/24 |
| 2013/0152200 A1 | 6/2013 | Alme et al. | 726/24 |
| 2013/0333033 A1* | 12/2013 | Khesin | G06F 21/55 726/23 |
| 2017/0083702 A1* | 3/2017 | Gathala | G06F 21/552 |
| 2018/0181752 A1* | 6/2018 | Guri | G06F 21/54 |

FOREIGN PATENT DOCUMENTS

| | | |
|---|---|---|
| WO | WO 2012/027669 A1 | 3/2012 |
| WO | WO 2014/039257 A2 | 3/2014 |

* cited by examiner

*Primary Examiner* — Kevin Bechtel
(74) *Attorney, Agent, or Firm* — Harrington & Smith

(57) ABSTRACT

There is provided a method for improving security of computer resources, including obtaining raw memory snapshots of a computer memory of one or more computing systems during runtime of identical processes relating to a predetermined application or a service; forming a map of expected memory behaviour relating to the application or the service based on the obtained raw memory snapshots; monitoring the memory behaviour of a computing system during the execution of the same application or the service; comparing the monitored memory behaviour of the computing system with the formed map of expected memory behaviour; and in the event that a deviation from the expected memory behaviour is detected based on the comparison, triggering an alert.

13 Claims, 4 Drawing Sheets

SECURITY OF COMPUTER RESOURCES

FIELD

The invention relates to the field of computer security and, particularly, protecting computer resources from malware attacks.

BACKGROUND

Computer viruses and malicious software (called malware) have existed for decades in computing environments. One example of known methods that are used to detect malware is memory scanning of applications for malware signatures. However, present methods can only be used for known malware. These methods are not effective against unknown malware or exploits. Therefore, improvements to the computer security are needed.

In computer security, an exploit is from victim point of view an object that causes software to behave in an unexpected and/or unwanted manner. The object is usually something that the software is unable to deal with. For example, a string of characters that does not fit an expected pattern or a series of commands that the software is unable to correctly execute.

When an exploit forces the software to behave unexpectedly, an attacker can take an advantage of the disruption to perform other, usually malicious actions that would not normally be permitted. For example, an attacker may exploit one software on a computer in such a way that a second software is silently installed without authorization from the user or administrator of the target device.

BRIEF DESCRIPTION

The invention is defined by the subject-matter of the independent claims.

Embodiments of the invention are defined in the dependent claims.

LIST OF DRAWINGS

Embodiments of the present invention are described below, by way of example only, with reference to the accompanying drawings, in which FIG. 1 illustrates a computer environment to which embodiments of the invention may be applied;

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
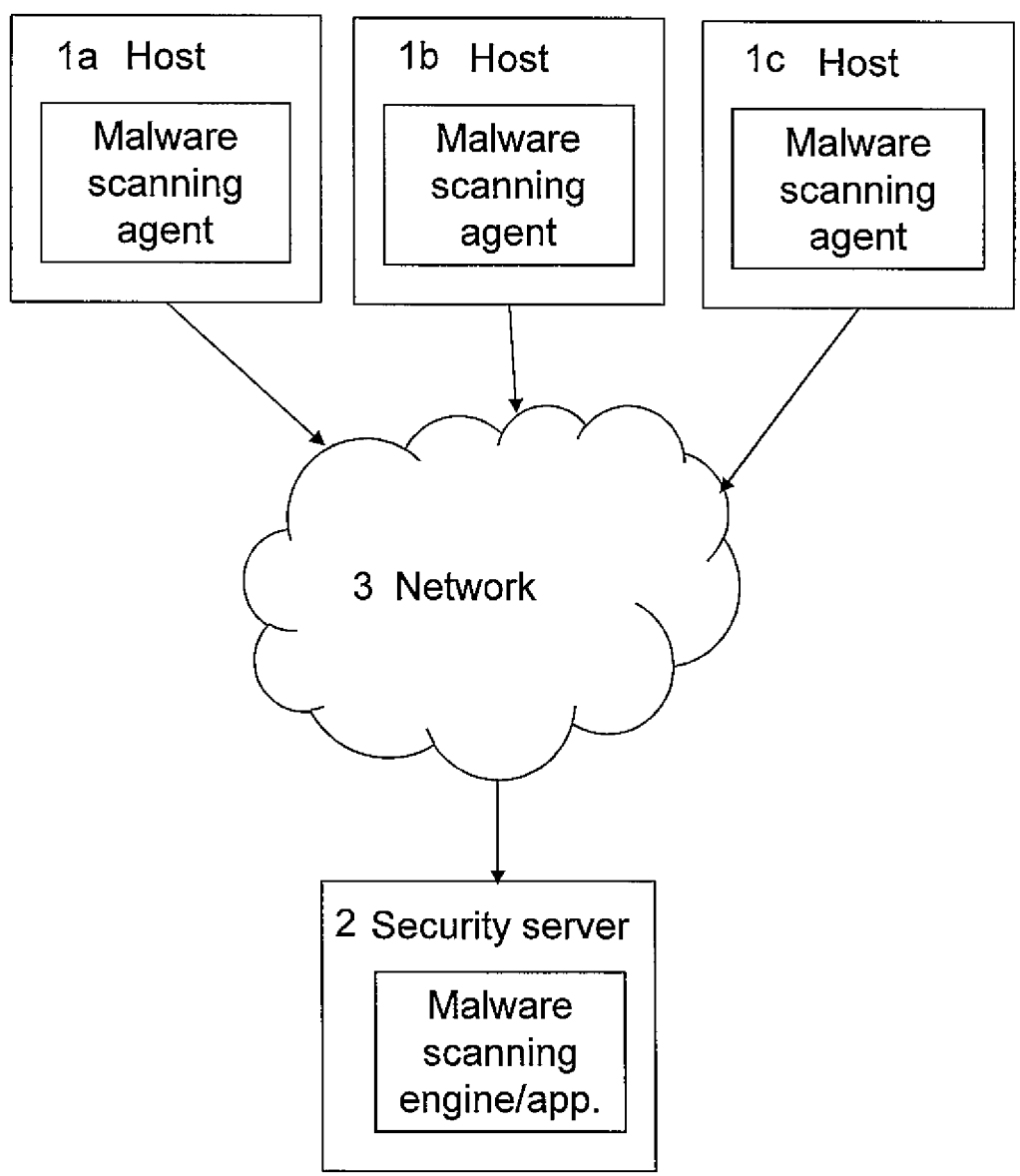

FIG. 1 illustrates a computing environment to which embodiments of the invention may be applied. Referring to FIG. 1, the computing environment comprises a set of computer resources, host systems 1a, 1b, 1c, that may form a computer configuration of a corporate network, for example. The computer resources of the computer network may comprise a set of computer resources realized by a plurality of devices. The devices may comprise server computers such as an e-mail server, an internet browser server, a network-accessed storage storing various databases and/or directories for various files, at least one printer device, etc. The resources of the network may be accessible to at least authorized users of the network. The authorization of the users may be realized through user credentials, e.g. a user name and an associated password. The resources may store confidential or sensitive information or control operation of vital operations in the network.

The host system 1a, 1b, 1c is configured to exchange security information with a remote security server 2. In the example configuration of FIG. 1 a plurality of host systems 1a-1c are connected to a security server 2 via a computer network 3. In an embodiment, the host systems 1a-1c may be client computers such as personal computing devices while the security server 2 may comprise a computer system configured by a network administrator to monitor malware threats or security events. In another embodiment, the host systems 1a-1d may be servers hosting numerous virtual machines and the security server 2 may be configured to control security operations for all the virtual machines. In yet another embodiment, the security server 2 may comprise a computer system provided by a security software provider and it is configured to receive statistical and/or behavioural data about malware detected on various systems connected to the network 3. The network may include a wide-area network such as the Internet and/or part of the network 3 may include also local area networks.

The host system 1a-1c as a personal computing device may comprise a processing system comprising at least one processor and at least one memory storing a computer program code controlling the operation of the at least one processor. The user may use the personal computing device to execute various computer processes of computer program applications, wherein at least some of the processes may require access to the cloud based resources.

Figure 2:
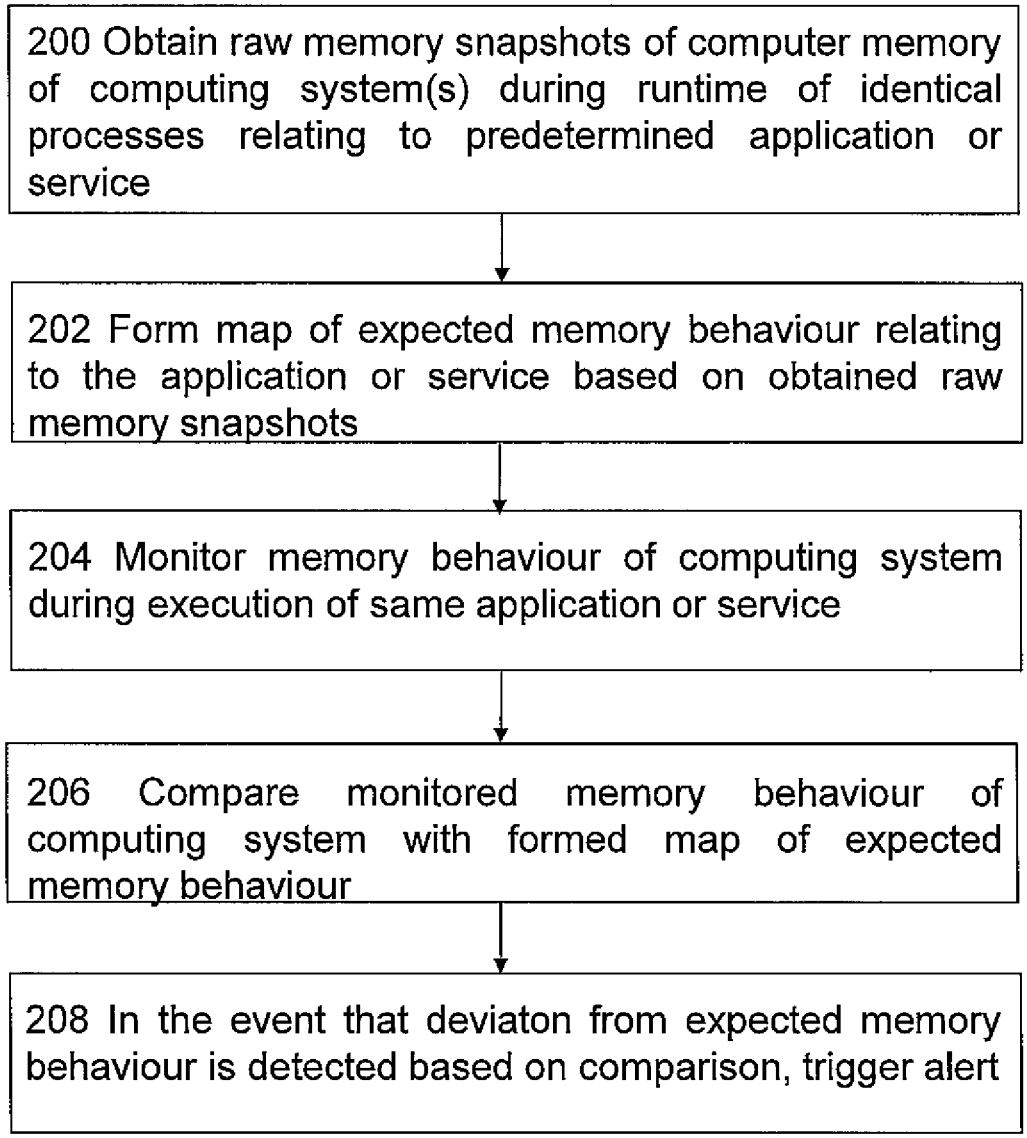
FIG. 2 illustrates a method according to an embodiment of the invention.

FIG. 2 illustrates an example method according to some embodiments of the present invention. All or at least some part of the method steps may be performed at a server device or an end-user device. In an embodiment, the method steps can either be done from inside a virtual machine using an agent or externally using a virtual machine monitoring interface, for example. The method is not limited to virtual machines but the agent based solution may be used for physical computer systems as well. In an embodiment, the method may be used inside a single system. More reliable results may however be achieved when done over several virtual machine systems, for example.

Referring to FIG. 2, the method starts at 200 where raw memory snapshots of a computer memory of one or more computing systems are obtained during runtime of identical processes relating to a predetermined application or a service. In an embodiment, the raw memory snapshots may be obtained by the security server 2 from one or more host systems 1a-1c. In an embodiment, the raw memory snapshots are obtained from one or more virtual machine systems, agent based systems, container systems or physical computer systems.

In 202, a map of expected memory behaviour relating to the application or service is formed based on the obtained raw memory'snapshots. Using memory snapshots of computer systems running identical or almost identical set of processes, it is possible to analyse the differences between memory dumps of processes of same application or service. In most cases the memory behaviour of these processes is almost identical: same kind of memory regions, same variables holding relatively same content and other variables and memory blocks holding content that varies during execution. Thus given enough memory snapshots between instances of same service or application, a map of expected memory behaviour can be build.

In 204, the memory behaviour of the computing system is monitored during the execution of the same application or service and in 206 the monitored memory behaviour of the computing system is compared with the formed map of expected memory behaviour. In an embodiment, the comparing comprises one or more of: analysing the similarity of, computing system memory regions; analysing same variables holding essentially same content; analysing memory blocks holding content that varies during execution.

In 208, in the event that a deviation from the expected memory behaviour is detected based on the comparison, an alert is triggered. Since the map of expected memory behaviour has been generated, it is possible to detect any instances that deviate from the expected behaviour. In an embodiment, the deviation from the expected memory behaviour is detected when the monitored memory behaviour of the computing system deviates from the map of expected memory behaviour in one or more predetermined ways. One example of typical differences that may be monitored is a new code that has not existed in memory of said process before. Typically clean files, unless they are obfuscated for example with copy protection, do load all code in memory at start. This means that new code appearing in process memory is not normal. Especially if that code is not present in the executable where the program is loaded from.

In an embodiment, the virtual machine memory snapshots/images do not have to be from the same master image but it is enough that the running service or application is identical for comparison.

In an embodiment, the deviation from the expected memory behaviour is further detected based on monitoring function call differences between the monitored computing system and predetermined list of allowed function calls related to the same application or service. The predetermined list of allowed function calls related to the same application or service is generated based on the list of functions imported in an executable import table, for example. A clean application will call only specific set of functions that belong to its normal operation. Thus it is possible to detect a misbehaving application if it starts calling functions that no other instances of this application have ever called.

If a process calls an operating system function, for example a directory listing (commonly done by attacker to see what files are in a file system but almost never done by the application), which is not done by any other process started from the same executable and that Dir function is not being listed in the import table, then it is rather obvious that the process is compromised.

A compromised instance of an originally clean process may be detected by monitoring the behaviour of multiple instances of the same process in different virtual machines, for example. In their typical operation the clean process instances will do roughly same operations and thus will enable generating a map of what that process does in its normal operation. This way it is possible to detect a process that deviates from the norm.

Figure 3:
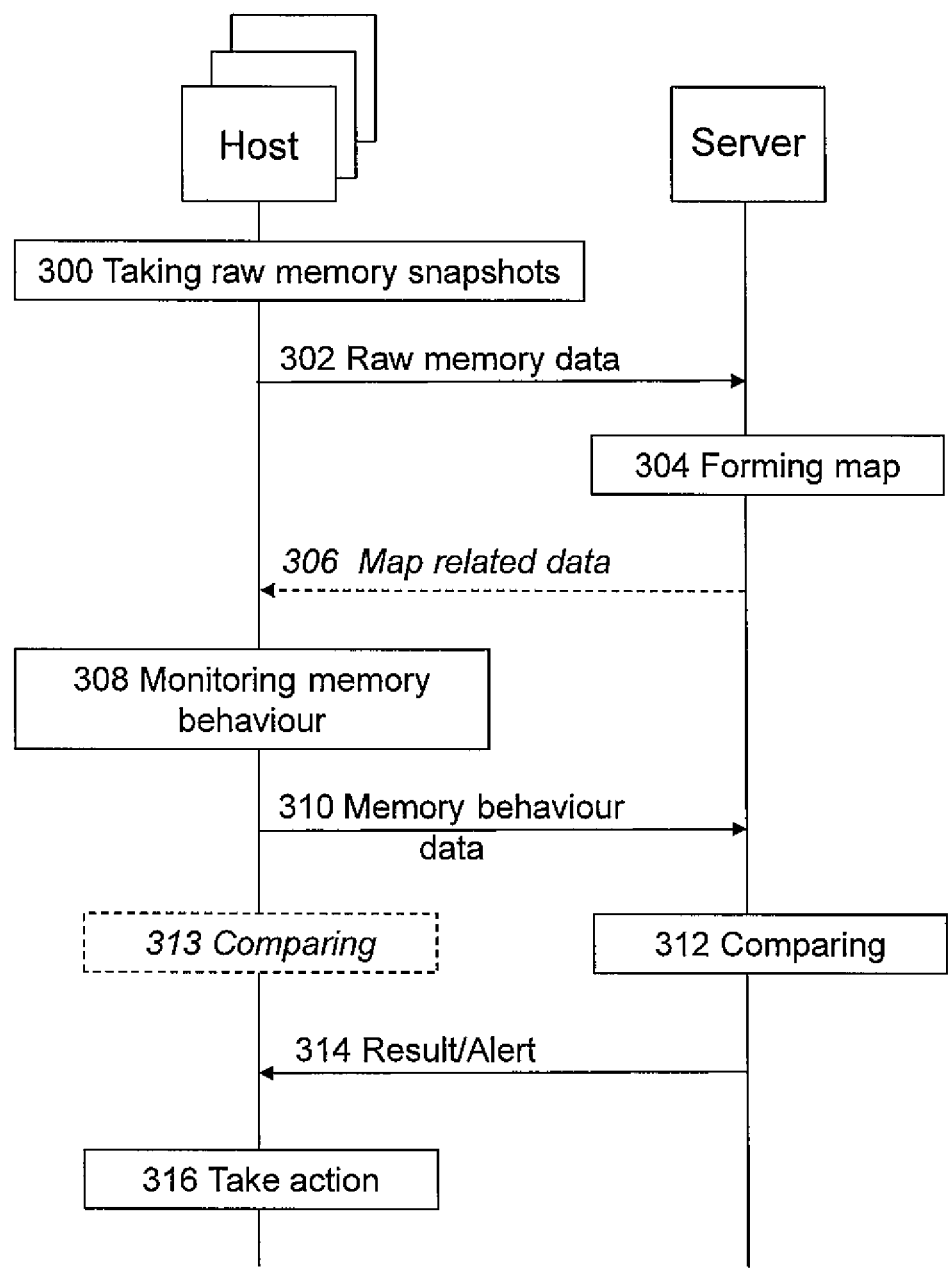
FIG. 3 shows a diagram illustrating an example of the method according to some embodiments of the invention.

Some embodiments of the procedure of FIG. 2 are next described with reference to a signalling diagram of FIG. 3. FIG. 3 illustrates the cooperation or interrelation between the operation of the first node, i.e. the method of/at the host illustrated in FIG. 1, and the operation of the second node, i.e. the method of/at the server illustrated in FIG. 1. Accordingly, reference is made to the above description of FIGS. 1 and 2 for details. The host process may be executed in the same physical device as the server process, or the processes may be executed in physically separate devices.

Referring to FIG. 3, the host process takes raw memory snapshots of a computer memory of the host system during runtime of a predetermined application or a service in step 300. This data is then transmitted to the server process in 302. The server process in now able to form a map of expected memory behaviour relating to the application or the service based on the obtained raw memory snapshots in 304. The raw memory snapshot data can be maintained in one or more databases in one or a plurality of separate locations, e.g. on different servers, and the databases are synchronized in real-time. Such databases may be designed for numerous read operations but only for occasional update operations. The database may be constructed by observing the normal operation of legitimate processes executed in relation to the same application or service and determining what type of information stored in the database is needed by the legitimate processes. Such information may alternatively be readily available in a cloud service, for example. It is possible that the map is formed once a predetermined amount of data has been received from the host(s) relating to a specific application/service. The map may be regularly or dynamically updated whenever new data or a certain amount of new data relating to the same application/service has been received.

In 308, the memory behaviour of the host system during the execution of the same application or the service is monitored by the host process and this data is then transmitted to the server process in 310. Thus, the server process is able to compare the monitored memory behaviour of the computing system with the formed map of expected memory behaviour in 312. The server process may transmit the result of the comparison back to the host process (in 314) or trigger transmitting an alert message in the event that a deviation from the expected memory behaviour is detected based on the comparison. It is possible that the server process only then notifies the host process when a deviation is detected. The host process may then take action on the basis of the result/alert message received in 316.

As indicated by italic font in FIG. 3, a procedure according to example embodiments of the present invention may additionally comprise an operation of transferring results of the generated map related data from the server to the host in 306. This enables the host process to implement the comparing the monitored memory behaviour of the computing system with the formed map of expected memory behaviour in step 313.

In an embodiment, when a deviation from the expected memory behaviour is detected, it may be recognized that the application or service is exploited by malware. Either the server or the host may take or initiate measures with regard to this kind of result. The server may instruct the host to perform further measures regarding the application or service, for example deleting or quitting the application/service or disinfecting or quarantining the malware. Any measures taken can also be implemented remotely by the server process.

Figure 4:
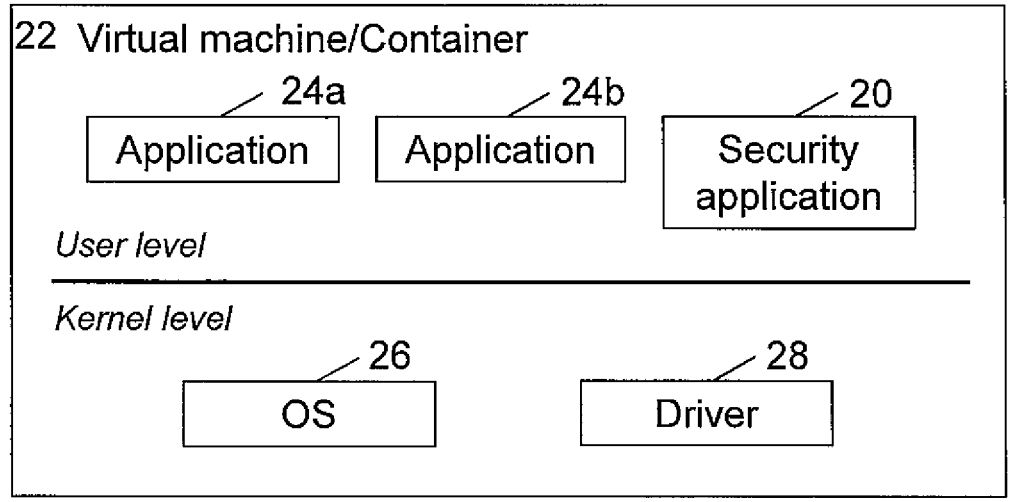
FIG. 4 is shows an example hierarchy of software objects executing on the host system according to an embodiment of the invention.

FIG. 4 illustrates a hierarchy of software objects executing on a host system according to some embodiments of the invention. In the example of FIG. 4, a hardware virtualization platform is presented as a virtual machine or a container 22 to other software executing on the host system. An operating system 26 executes within the virtual environment of the virtual machine 22. A set of applications 24a, 24b execute at lesser processor privileges than the operating system 26. In an embodiment, some part of the security application 20 may execute at user-level processor privileges, such as graphical user interface that may be used to inform the user of any detected exploit or security threats detected and/or receiving input from the user. Some parts of the security application 20 may execute at the kernel privilege level and for example install an anti-malware driver 28.

Figure 5:
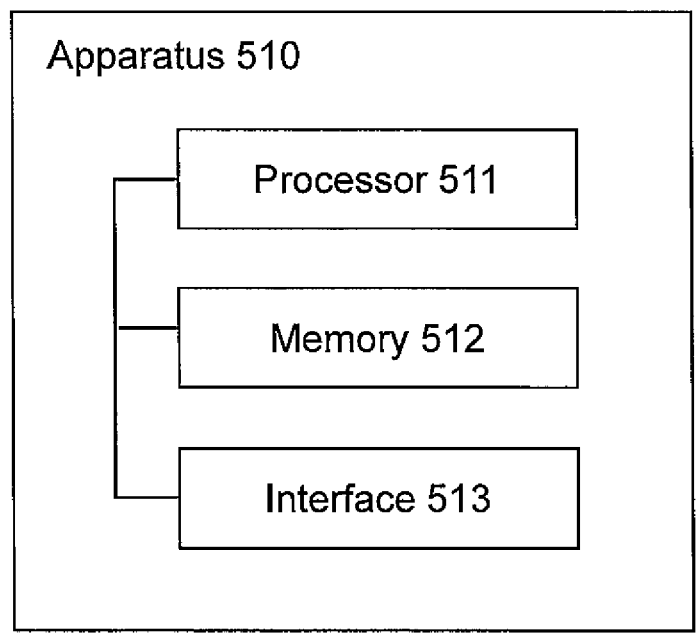
FIG. 5 shows a block diagram illustrating a structure of an apparatus according to an embodiment of the invention.

FIG. 5 illustrates a block diagram of an embodiment of an apparatus for carrying out the embodiments described above. The apparatus 510 may be comprised in the client or host computer or in a server computer of the computer network. The apparatus 510 may comprise a processing system configured or arranged to carry out computer security functions. The apparatus 510 may, for example, represent a (part of a) first node, such as host 1 in FIG. 1, or may represent a (part of a) second node, such as server 2 in FIG. 1. The apparatus 510 may be configured to perform a procedure and/or exhibit a functionality as described in any one of FIGS. 2 to 5.

The processing system may comprise at least one processor 511 and at least one memory 512 including a computer program code, wherein the at least one memory 512 and the computer program code are configured, with the at least one processor 511, to cause the apparatus to carry out the above-described embodiments of the invention. The apparatus may possibly also comprise at least one interface 513.

The processing system may refer to any one of the following: (a) a hardware-only circuit implementation such as an implementation in only analogue and/or digital circuitry; (b) a combination of hardware circuitry and software and/or firmware, such as (as applicable): (i) a combination of processor(s) or processor cores; or (ii) portions of processor(s)/software including digital signal processor(s), software, and at least one memory that work together to cause the apparatus to perform specific functions; and (c) circuits, such as a microprocessor(s) or a portion of a microprocessor(s), that require software or firmware for operation, even if the software or firmware is not physically present. The processing system may also cover an implementation of merely a processor (or multiple processors) or portion of a processor, e.g. one or multiple cores of a multi-core processor, and its (or their) accompanying software and/or firmware. The term processing system would also cover, for example, an integrated circuit, an application-specific integrated circuit (ASIC), and/or a field-programmable grid array (FPGA) circuit for the apparatus according to an embodiment of the invention.

Referring to FIG. 4, the processor 511 may be configured to execute an operating system (OS) 26. The operating system may be a Windows-based OS such as Windows 7, Windows 8, Windows 10, Windows Server OS, Linux OS, or Unix OS. As known in the art, the operating system 26 manages hardware resources, e.g. the processor(s) and provides services to applications 24 executed in a computer.

The services may be provided through one or more APIs that serve as an interface between the applications and the operating system 26. The applications 24 may comprise any known computer program applications including security applications, gaming and/or utility applications, office applications, professional applications related to any professional field, a web browser, etc. The security application 20 may execute the above-described anti-malware computer process.

The security application 20 may comprise an anti-virus and/or anti-malware engine, a firewall, a network traffic monitor, etc. for tracking any known attack vector to prevent a virus, worm, or malware from accessing the apparatus and/or operating in the apparatus. The security application 20 may also provide a functionality for providing the isolated environment where behaviour of a computer process may be monitored without causing any damage or risk for the legitimate processes and vital information stored in the computer network. The security application 26 may comprise a malware monitoring module configured to monitor the functions carried out by the monitored application, service or process. Upon detecting that the monitored process is performing suspiciously, the malware monitoring module may call a quarantine module configured to restrict the operation of the identified computer process and associated application. The quarantine module may prevent further actions by the application, quarantine the application or delete the application. The security application may further output a notification through a display unit of the apparatus that a potentially harmful application has been detected and removed.

The security software application may be a self-sustained application able to detect and quarantine any viruses, attack vectors, and malware autonomously, or it may contact a security server for instructions or virus/malware definitions upon detecting suspicious content or a possible attack vector. The attack vector may be defined as a path or means by which a hacker (or cracker) attempts to gain access to the personal computing system or to a network server in order to deliver a payload or malicious outcome. Attack vectors enable hackers to exploit system vulnerabilities, including the human element. The attack vector may carry a payload comprising a virus, a malicious web page, a pop-up window, or any other malicious or inconvenient content.

The apparatus may further comprise the user interface comprising a display unit, an input device, etc. The user interface may comprise a touch-sensitive display, one or more hard buttons, etc.

The processes or methods described in FIGS. 2 to 3 may also be carried out in the form of a computer process defined by a computer program. The computer program may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

For further details regarding the operability/functionality of the individual elements according to exemplifying embodiments of the present invention, reference is made to the above description in connection with any one of FIGS. 1 to 5, respectively.

According to exemplifying embodiments of the present invention, any one of the processor, the memory and the interface may be implemented as individual modules, chips, chipsets, circuitries or the like, or one or more of them can be implemented as a common module, chip, chipset, circuitry or the like, respectively.

According to exemplifying embodiments of the present invention, a system may comprise any conceivable combination of the thus depicted devices/apparatuses and other network elements, which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or units, means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible or non-transitory medium such as a computer-readable (storage) medium having stored thereon a respective data structure or code means/portions or embodied in a signal or in a chip, potentially during processing thereof. A computer program product encompasses a computer memory encoded with executable instructions representing a computer program for operating/driving a computer connected to a network.

The present invention also covers any conceivable combination of method steps and operations described above, and any conceivable combination of nodes, apparatuses, modules or elements described above, as long as the above-described concepts of methodology and structural arrangement are applicable.

The present invention is applicable to apparatuses defined above but also to other suitable systems or computer networks. The specifications of the systems develop rapidly and such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. A method for improving security of computer resources, comprising:
    obtaining raw memory snapshots of a computer memory of one or more computing systems during runtime of multiple instances of identical processes relating to a same application or a service;
    forming a map of expected memory behaviour relating to the application or the service based on the obtained raw memory snapshots;
    monitoring a memory behaviour of a computing system of the one or more computing systems during execution of the same application or the service;
    comparing the memory behaviour of the computing system as monitored during the execution of the same application or the service with the formed map of expected memory behavior; and
    in response to detecting a deviation from the expected memory behaviour during the execution of the same application or the service based on the comparison, restricting operation of the same application or the service.

2. The method of claim 1, wherein the deviation from the expected memory behaviour is detected when the memory behaviour of the computing system deviates from the map of expected memory behaviour in one or more predetermined ways.

3. The method of claim 1, wherein comparing the memory behaviour of the computing system with the formed map of expected memory behaviour comprises one or more of:
    analysing the similarity of computing system memory regions;
    analysing same variables holding essentially same content;
    analysing memory blocks holding content that varies during the execution of the same application or the service.

4. The method of claim 1, wherein the raw memory snapshots are obtained from one or more virtual machine systems, agent based systems, container systems or physical computer systems.

5. The method of claim 1, wherein the deviation from the expected memory behaviour is further detected based on monitoring function call differences between the monitored computing system and predetermined list of allowed function calls related to the same application or service.

6. The method of claim 5, wherein the predetermined list of allowed function calls related to the same application or service is generated based on the list of functions imported in an executable import table.

7. An apparatus comprising a processing system configured to:
- obtain raw memory snapshots of a computer memory of one or more computing systems during runtime of multiple instances of identical processes relating to a same application or a service;
- form a map of expected memory behaviour relating to the application or the service based on the obtained raw memory snapshots;
- monitor memory behaviour of a computing system of the one or more computing systems during execution of the same application or the service;
- compare the memory behaviour of the computing system as monitored during the execution of the same application or the service with the formed map of expected memory behaviour; and
- in response to detecting a deviation from the expected memory behaviour during the execution of the same application or the service based on the comparison, restrict operation of the application or the service.

8. The apparatus of claim 7, wherein the processing system is configured to detect the deviation from the expected memory behaviour when the memory behaviour of the computing system deviates from the map of expected memory behaviour in one or more predetermined ways.

9. The apparatus of claim 7, wherein the processing system is configured to
- compare the memory behaviour of the computing system with the formed map of expected memory behaviour by one or more of:
- analysing the similarity of computing system memory regions;
- analysing same variables holding essentially same content;
- analysing memory blocks holding content that varies during the execution of the same application or the service.

10. The apparatus of claim 7, wherein the processing system is configured to obtain the raw memory snapshots from one or more virtual machine systems, agent based systems, container systems or physical computer systems.

11. The apparatus of claim 7, wherein the processing system is configured to detect the deviation from the expected memory behaviour based on monitoring function call differences between the monitored computing system and predetermined list of allowed function calls related to the same application or service.

12. The apparatus of claim 7, wherein the processing system is configured to generate the predetermined list of allowed function calls related to the same application or service based on the list of functions imported in an executable import table.

13. A non-transitory computer-readable storage medium having stored thereon a computer program code that, when executed by at least one computer processor, causes the at least one computer processor to perform:
- obtaining raw memory snapshots of a computer memory of one or more computing systems during runtime of multiple instances of identical processes relating to a same application or a service;
- forming a map of expected memory behaviour relating to the application or the service based on the obtained raw memory snapshots;
- monitoring a memory behaviour of a computing system of the one or more computing systems during execution of the same application or the service;
- comparing the memory behaviour of the computing system as monitored during the execution of the same application or the service with the formed map of expected memory behavior; and
- in response to detecting a deviation from the expected memory behaviour during the execution of the same application or the service based on the comparison, restricting operation of the same application or the service.

* * * * *